US006957425B1

(12) United States Patent
Nadon et al.

(10) Patent No.: US 6,957,425 B1
(45) Date of Patent: Oct. 18, 2005

(54) AUTOMATIC TRANSLATION OF TEXT FILES DURING ASSEMBLY OF A COMPUTER SYSTEM

(75) Inventors: Robert G. Nadon, Georgetown, TX (US); John C. Nunn, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/450,550

(22) Filed: Nov. 30, 1999

(51) Int. Cl.[7] .............................................. G06F 9/445
(52) U.S. Cl. .......................... 717/175; 717/169; 704/8; 704/9
(58) Field of Search ................ 717/114–115, 174–178, 717/136, 168–170; 704/8, 9

(56) References Cited

U.S. PATENT DOCUMENTS

| | | | | |
|---|---|---|---|---|
| 5,359,725 | A * | 10/1994 | Garcia et al. | 707/200 |
| 5,555,416 | A * | 9/1996 | Owens et al. | 717/178 |
| 5,664,206 | A * | 9/1997 | Murow et al. | 704/8 |
| 5,894,571 | A * | 4/1999 | O'Connor | 713/2 |
| 5,903,859 | A * | 5/1999 | Stone et al. | 704/8 |
| 5,946,002 | A * | 8/1999 | Lowry | 345/474 |
| 5,960,206 | A * | 9/1999 | Barsness et al. | 717/174 |
| 5,963,743 | A * | 10/1999 | Amberg et al. | 717/174 |
| 6,006,035 | A * | 12/1999 | Nabahi | 717/175 |
| 6,080,207 | A * | 6/2000 | Kroening et al. | 717/172 |
| 6,182,275 | B1 * | 1/2001 | Beelitz et al. | 717/175 |
| 6,247,128 | B1 * | 6/2001 | Fisher et al. | 713/100 |
| 6,374,239 | B1 * | 4/2002 | Anderson et al. | 707/4 |
| 6,466,900 | B1 * | 10/2002 | Lissauer et al. | 704/7 |

FOREIGN PATENT DOCUMENTS

| | | | |
|---|---|---|---|
| EP | 1100004 A2 * | 5/2001 | G06F 9/44 |

OTHER PUBLICATIONS

"Dictionary of Computing: Fourth Edition"; Oxford University Press; 1992; pp. 434.*

Karat et al.; "Perspectives on Design and Internationalization"; SIG CHI Bulletin; Volumn 28, No. 1; Jan. 1996; pp. 39-40.*

* cited by examiner

*Primary Examiner*—Kakali Chaki
*Assistant Examiner*—William H. Wood
(74) *Attorney, Agent, or Firm*—Haynes and Boone, LLP

(57) ABSTRACT

A method of providing a desired language version of textual portions of a source code program for a computer system. During the system assembly process, a system description record (SDR) is read that identifies the operating system, including the desired language version thereof, and other software programs. A text file corresponding to at least one of the programs is read and a native-language version of the program is installed on the computer system. A translation script operates to select a translation routine from a set of available translation routines, the selection being based on the nature of the text file, the operating system, and the desired language translation. The translation routine locates native-language text strings in the text file and substitutes the desired language translations of those strings. The translation process takes place substantially concurrently with installation of the program in the computer system.

12 Claims, 1 Drawing Sheet

AUTOMATIC TRANSLATION OF TEXT FILES DURING ASSEMBLY OF A COMPUTER SYSTEM

BACKGROUND

This disclosure relates to the design, development and distribution of computer systems and, more particularly, to a technique for automatically providing the desired language translation of textual components of a software program, the translation to be provided concurrently with the installation of the program during assembly/manufacture of the computer system.

DESCRIPTION OF THE RELATED ART

Software programs frequently are developed and marketed with a view to global distribution. Software products that are available with documentation and a user interface expressed in only a single language generally have limited appeal. To address a worldwide market, software must be translated into a number of different languages.

However, distribution of a software program in multiple languages is a daunting task. Historically, the requirement to maintain and support software packages in multiple language versions presents a difficult operational issue, usually involving translation of text strings in the software program and subsequently the maintenance and distribution of several versions of the program. A separate version of the program is accordingly required to support each foreign language.

Conventionally, multiple versions of a program are supported by translating the text strings appropriate to each foreign language version of the program from corresponding text strings in the native-language version. Following translation, each foreign language version is supported independently. However, the support of multiple software versions enhances the liklihood that errors will be introduced into the software, thereby complicating software development, maintenance and support.

Various techniques have been employed to manage the support of multiple languages in a software program. According to the most prevalent technique, the native-language version of source code is edited and each text message is translated into the desired foreign language counterpart. Another method requires creation of a predefined message token in respect of each text message. The token is then inserted into the source code at a requisite position. Message tokens are replaced at a later time. Each of these techniques has attendant drawbacks. When the souce code is edited, inadvertent code changes may occur between the separate software versions, reducing software reliability and possibly causing nonuniform operation among the program versions. The reliance on reference tokens, and an associated table of text entries that correspond to the tokens, gives rise to the possibility that the tokens and table become misaligned, so that an inappropriate message may be expressed by the program.

The management of numerous language versions of software is further complicated when software modules are developed by, or otherwise acquired from, a source other than the original software developer. In many cases, the external source is a vendor that is able to supply a module in only the native-language. Furthermore, many vendors supply object or executable code only, so that source code is not available for translating into multiple languages.

The above difficulties associated with the development, maintenance, and support of multiple-language software programs are squarely addressed in U.S. Pat. No. 5,903,859, "Dynamic Software Module System", which is commonly assigned with this patent application. That patent relates to a software system that facilitates the translation of text strings into multiple languages as desired. The software system inserts, in source code, a macro that is substituted where a text string would otherwise appear. A message collection and source update utility scans the source code to locate the macro. The utility derives a key relating to the text string and updates a database with the text string and key.

Although U.S. Pat. No. 5,903,859 undeniably represents a significant breakthrough in the development, maintenance and support of software systems in multiple-language versions, the subject disclosure further advances the state of the art by affording a technique for implementing multiple-language versions of software programs that are to be installed in computer systems that are specifically preconfigured at the time of system assembly, according to the particular requirements of an individual customer. In particular, in the context of a computer system assembly process designed to accommodate the specific requirements of individual customers on an ad hoc basis, it has been found desirable, if not necessary, to download portions, if not all, of the software at the time of system assembly. The computer's operating system software is a primary example of software that must be installed concurrently with the assembly of the computer system. Accordingly, in this context what is desired is an efficient and convenient technique for translating textual portions of the operating system or other software, including software that depends on or is controlled by the operating system, at the time of downloading that software during the course of system assembly.

A primitive approach to "on-the-fly" textual translation contemplates manual editing of textual strings in real time during software installation. A somewhat less primitive approach to this task involved creating a software utility program (a script) that would read and translate text files at the time software was downloaded into the computer system. However, a customized script would need to be written for each possible combination of operating system(s) and language translations. Consequently, if the applicable universe of operating systems was assumed to be equal to N, and the possible number of translations is M (where the translations might include, for example, English, French and Spanish), then N×M scripts would be required to accommodate all possible combinations of translations of operating systems.

In a manner to be made presently clear, a notable improvement is realized by the subject disclosure, wherein only a single installation script is required to launch necessary translations of software that contains textual portions, such as messages, that depend on the prevailing operating system and desired language translation.

SUMMARY

The above and other objects, advantages and capabilities are achieved in one aspect by a method of installing desired-language translation of software in a computer system at the time the computer system is assembled. According to the method, a record is created, in response to a customer's order, that comprises identifiers that specify which software is to be installed in the computer system. Operating system software is installed, as determined by a first identifier that identifies the type of operating system and a desired-language. A second identifier that identifies other software to be installed is read from the record and is parsed to a call to a batch file that constitutes an installation script. The installation script causes a native-language version of the other software to be installed in the computer system and in turn, calls a translation script. Based on the type of file in which the other software is stored, and on the installed operating systems, the translation script selects a translation routine from a set of available translation routines. Based on the desired-language translation, the selected translation routine identifies native-language textual portions of the other software and substitutes desired-language translations.

A cognate embodiment of the disclosure is represented in a method of providing the appropriate translation of textual portions of a source code program to be installed in a computer system in the course of assembling the system. The method comprises (a) reading a file to determine the source code program, and the corresponding selected language version of that source code program, to be installed in the computer system; (b) calling a translation string set that corresponds to the source code program; (c) reading from the translation string set the translation strings required by the selected language version; (d) searching a file that constitutes at least a portion of the source code program to find a string; (e) finding among the translation strings read in Step (c) a matching string that matches the string found in Step (d); and (f) substituting into a given file the matching string found in Step (e) for the string found in Step (d).

Another aspect is embodied in a computer system in which there is installed a source code program with translated textual components. The appropriately translated textual components are installed, during assembly of the computer system, by initially reading a (system description record) file to identify the source code program, and the selected language version of the textual components of that program, that are to be installed in the computer system. A call is then made to a translation string set that corresponds to the program, and the translation strings that apply to the selected language version of the program are read from the string set. Subsequently, a textual string is located in the program and a matching, appropriately translated, string is found among the strings previously read from the translation string set. The matching string is then substituted for the string that had been formerly embedded in the source code program.

A further aspect represents a method of translating text portions of software, concurrently with the loading of the software into a computer system. According to the method, the software to be installed is identified. A first utility associated with the software to be installed reads language-specific files associated with the software. A second utility, specific to the applicable language translation of the software, substitutes the necessary text translations into the language-specific file.

Yet another aspect is embodied in a system for installing software into a computer, as the computer is assembled. The system comprises a server that stores a native-language version of the software and comprises means, such as a LAN, for coupling the server to the computer during software installation. A system description record (SDR), created in response to a customer order, contains an identifier that specifies the software to be installed in the computer. An installation script, stored on the server, operates in response to the identifier to cause the native-language version of the software to be downloaded via the LAN to the computer. A translator script, also stored on the server, is called by the installation script and, in turn, selectively calls one of a set of translation routines in that identify text strings in the software that need to be translated and that substitute the desired-language translation for the identified strings.

The disclosure is similarly realized in a server, or equivalent processor, coupled to a computer system that is to be preconfigured in response to a customer's order. The server includes an installation utility for installing software in the computer system during assembly. An installation script running on the server operates in response to a software identifier to cause a native-language version of software to be downloaded from the server to the computer system. The server also runs a translation script that, when called by the installation script, selects a translation routine from a set of such routines, wherein the selected routine identifies native-language text strings in the downloaded software and substitutes the desired-language translations for the identified native-language strings.

BRIEF DESCRIPTION OF THE DRAWINGS

The present disclosure may be better understood, and its numerous objects, features, and advantages made apparent to those skilled in the art by referencing the accompanying drawings, in the several figures of which like numerals identify identical elements, and wherein.

DESCRIPTION OF THE PREFERRED EMBODIMENT(S)

For a thorough understanding of the subject disclosure, reference is made to the following Description, which includes the appended claims, in connection with the above-described Drawings.

Figure 1:
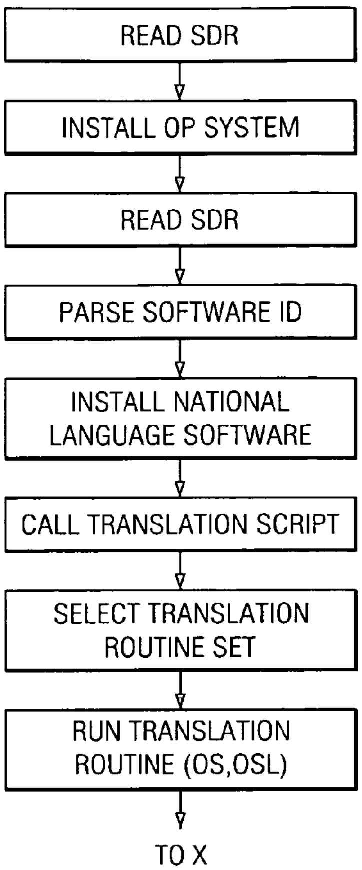
FIGS. 1 and 1A include a flow diagram depicting a method of automatically translating text files during the downloading of software into a computer system at the time of system assembly.
Figure 1A:
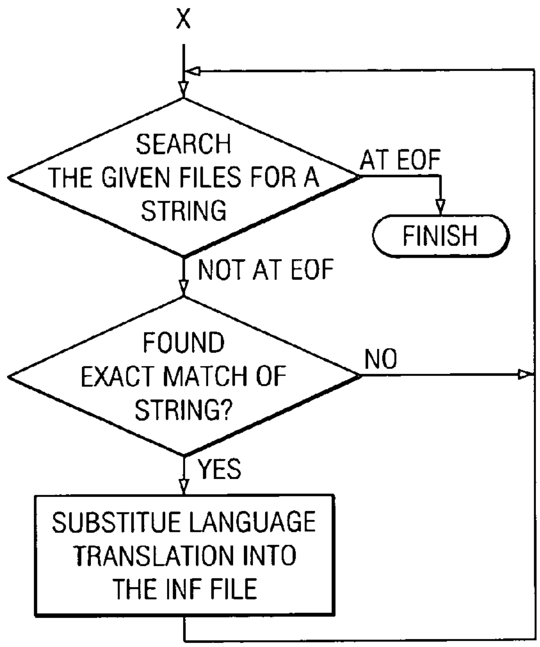

As alluded to above, a state-of-the-art computer assembly process enables each computer system to be preconfigured in accordance with the specific requirements of individual customers. At the time of system assembly, various optional hardware assemblies may be installed into, and specified software downloaded to, the computer system, all in accordance with the customer's order. Assembly of the computer system and, in particular, installation of software in that conforms to the customer's specifications proceeds in the manner illstrated as the flow chart in FIG. 1.

Upon receipt of the customer's order, which may be placed over any one of a number of communication channels, for example, telephone, facsimile, e-mail, paper mail, etc., a System Description Record (SDR) is created. In essence, the constituents of the SDR are identifiers in the form of line items, or data, that correspond to and identify each of the optional hardware and software componenets that the customer has ordered in configuring the computer system. In fact, in a preferred embodiment, the SDR line items are alphanumeric part numbers that specify components of the computer system. Although numerous such components are itemized in the SDR, in order to appreciate the invention at hand, it is necessary to understand that the operating system, in a specified language, is included among the customer-specified software components of the system.

Similarly, customer-specified hardware includes, among other devices, a video graphics adapter. As is well understood, the operating system ultimately is installed on the system hard disk drive, and the video graphics adapter is inserted into a bus slot. Of course, operation of the video graphics adapter is controlled by software in the form of a video driver.

In order to assemble the computer system in conformance with the customer's orders, the SDR is read and hardware components of the system are installed. In a preferred embodiment, software components are installed subsequent to the installation of hardware. Installation of software components is realized through use of the combined hardware/software system depicted in FIG. 2.

Figure 2:
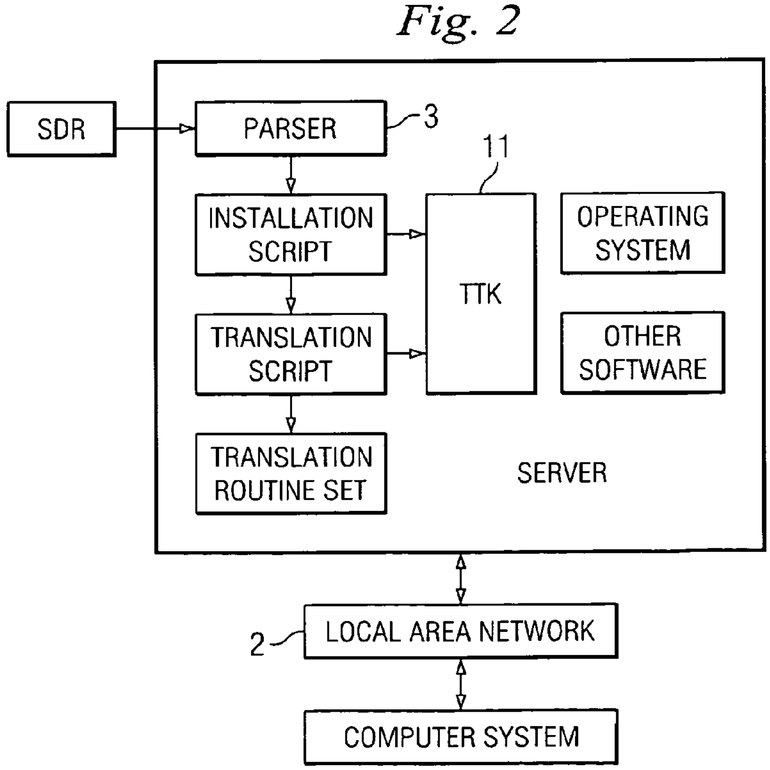
FIG. 2 is a block diagram of a combined hardware/software system, including a processor in the form of a server and a number of software utilities and scripts, that enables textual portions of software to be translated as a computer system is assembled.

As may be seen from FIG. 2, during the assembly process, the computer system, presumably with all optional hardware components in place, but as yet no software installed, is connected to a server 1. In the contemplated factory environment, the computer assembly is coupled to the server through a local area network (LAN), but other connecting mechanisms, such as direct cabling, are contemplated. As with installation of the customer-selected hardware components, software installation is driven by the SDR. That is to say, the software components to be installed in the computer system are specified by, or derived from, information contained in the SDR that was created in response to the customer's order. Installation of software is facilitated by a set of installation utilities known as the Thompson Toolkit (TTK) 11, which is commercially available from Thompson Automation, Inc., Portland, Oreg. In essence, TTKII is a UNIX compatible command system that consists of two major components: the TTK shell and the TTK Utility Commands. The TTK shell is a command interpreter that may be invoked as a program from a number of operating systems, including DOS, OS/2, Windows NT or Windows 95. The TTK shell may be used both for command entry and for shell script execution. The TTK Utility Commands perform a variety of necessary computer-system tasks. The set of TTK Utility Commands consists of two types: "external" commands and "internal" commands. External commands are supplied as stand-alone executable programs, also known as ".exe" files. All TTK external commands can be run either from the TTK shell or directly from a compatible operating system command interpreter. Internal commands are executed directly by the TTK Shell and therefore can be invoked only from the TTK Shell or by running a shell script. A thorough understanding of the operation and capabilities of TTK11 may be had from the user's manual entitled "Thompson Toolkit," published by Thompson Automation, Inc. In a preferred embodiment, TTK11 resides and runs on server 1.

As indicated above, software is installed in the computer system in response to data read from the SDR. It may be assumed that the first software component to be installed is the operating system software. Typically the customer will specify an operating system, such as Win 2000™, Windows NT™, Windows 95™, Windows 98™, or the like. The customer will also specify the desired language version of the operating system, for example, English, French, Spanish, German, and so forth. Each operating system, and each language version thereof, will have been assigned a part number prior to assembly, and the assigned part number appears as a data item in the SDR. All available operating systems, as well as the corresponding available language versions of those operating systems, are stored on server 1. When the data item (that is, part number) identifying a specific language version operating system is read, operation of the TTK causes the identified operating system, in the desired language, to be downloaded from the server, through the LAN, and installed in the computer system. In addition, upon identification of the operating system, two global variables are created. To wit: $OS is a variable that identifies the installed operating system, and $OSL is a variable that identifies the desired language version of the operating system. In the manner indicated below, these variables will be relied on in the installation, and appropriate translation, of other software (such as the video driver) that is yet to be installed in the system.

For purposes of explanation, it may be assumed that the next data item to be read from the SDR identifies the video driver that is required by the graphics adapter card selected by the customer. The video driver will similarly be identified by an alphanumeric part number and will appear as a data item in the SDR. Assuming, for pedagogical purposes, that the part number corresponding to the video driver is "fish 6", then based on that part number, a parser 3 parses a table file (not shown) to determine the installation script that must be run in order to install and properly translate the video driver. In essence, parser 3 operates to parse the part number into a call to a batch file that contains the installation script. In this instance the batch file is found to contain the following commands:

unzip.sh fish6all ZN4

Itrans.sh C:\winnt\inf\video.inf

The first command line of the installation script causes the video driver to be "unzipped" and downloaded into the computer system. This step is performed by calling and running a software utility such as PKUNZIP, available from PKSoftware, Inc. As is well known, PKUNZIP uncompresses compressed files. It is important to note that at this point in the installation process, a native-language version of the video driver that is installed in the computer system. It may be understood for present purposes that the video driver is written under the assumption that English is the native language, so that the textual portions of the video driver are installed in the English language. The second line of the installation script calls a translation script that also runs on server 1 and identities by the extension ".inf" the type of file in which the textual portions of the video driver are stored.

Translation script captures the extension ".inf" in the second line of the installation script to determine the type of file in which the textual portions of the video driver are found and, based on the nature of that file, as well as the previously established global variables that specify the operating system ($OS) and desired language version ($OSL), calls an indicated translation routine from N sets of available translation routines.

The preferred mode of implementing the translation script results in a plurality, N, of translation routine sets, each such set including individual routines for translating a specific type of text file into a given operating system. If, as indicated in the translation script set forth below, four types of text files are encountered (ISS, INF, SCR, and WYL) then the number of translation routine sets is equal to four times the number of operating systems encountered. Furthermore, in a manner described below, each routine set contains translation routine for each language into which the native-language text must be translated. The translation script appears below:

```
if[$1""=""]
then
    echo "ltrans.sh: missing filename">>$LOG
    exit $AUDITERR
fi
fext=${1##*.}
echo "lunching $ {fext}-based Language translator"
case $fext in
    iss)
        . isstrans.${OS} $1
    ;;
    inf)
        . inftrans.${OS} $1
    ;;
    scr)
        . scrtrans.${OS} $1
    ;;
    wyl)
        . wyltrans.${OS} $1
    ;;
    *)
        echo "Unknown extension \"$fext\"">>$LOG
        exit $AUDITERR
    ;;
esac
exit 0
```

From the above, it may be seen that the translation script anticipates text files of more than one type. Specifically, in the embodiment described herein, four types of files are accommodated by the translation script. However, the disclosure comprehends any reasonable number of text files as necessary. These file types are similarly identified by an extension on the installation script command "ltrans.sh [ ]. EXT," where "EXT" corresponds to one of the text file types. In the embodiment described, these files are identified by the acronyms: ISS, INF, SCR, and WYL. For example, an ISS file is a text file that contains answers to queries posed by software such as Install Shield, well known to those familiar with the art. Similarly, an INF file corresponds to a driver installation program used by Windows-type operating systems. The character of the text-type files does not represent an aspect of the subject disclosure. However, it is germane to the disclosure that the installation script and translation script recognize different text file types. In addition, operation of the translation routines is predicated on knowledge of the text strings that are confronted in the respective text files.

Each of the translation routine sets, which also reside and run on server 1 contains a translation routine for each available foreign language under each type of available operating system. Again, the specific translation routine is selected by the translation script in the manner indicated above. Each of the translation routines operates to search for specific native-language text strings in the software files and substitute the desired-language translation for the native-language string. An example of a translation routine is set forth immediately below. The example is a routine that translates native-language (that is, English) text into Brazilian Portugese.

```
case @OSL" "in
"BRZ"
sed -i 's/Program Files/Programas/g' $1|cat>$1
sed -i 's/Start Menu/Menu Iniciar/g' $1|cat>$1
sed -i 's/Programs/Programas/g' $1|cat>$1
sed -i 's/Accessoires/Acessorios/g' $1|cat>$1
sed -i 's/Favorites/Favoritos/g' $1|cat>$1
sed -i 's/Application Data/Dados de aplicativos/g' $1|cat>$1
sed -i 's/Administrator/Administrador/g' $1|cat>$1
sed -i 's/Personal/Pessoal/g' $1|cat>$1
```

For example, in the first line of the translation routine set out above, the routine searches for the English language text "Program Files" and substitutes the Brazilian word "Programas." Similarly, in the second line, upon finding the English phrase "Start Menu" the routine substitutes in the text file the Brazilian "Menu Iniciar." In order to create a set of translation routines, the given software text file must be examined manually, a priori, and native text strings empirically identified. Once the to-be-translated strings are identified, the routines in that set are completed by providing the appropriate (in the example, Brazilian) translation of each for the identified strings.

From the above, it may be appreciated that the subject disclosure offers significant operational improvements and advantages with respect to heretofore known approaches to translating textual portions of software programs. Perhaps paramount is the fact that the disclosure enables textual portions of software to be translated into the desired language substantially contemporaneously with the installation of that software into a customer-specified computer system. As a result, only a single native-language version of that software need be stored for downloading into computer-systems, irrespective of the operating system and desired language specified by the customer. Furthermore, rather than requiring a customized installation script for each combination of text file, operating system and desired language, the disclosure requires only a single installation script for each language-sensitive software program.

Although the disclosure has been described with respect to the specific exemplary embodiments set forth above, it is not necessarily limited to those embodiments. Various modifications, improvements, and additions may be implemented by those with skill in the art, and such modifications, improvements and additions will not depart from the scope of the disclosure, as defined by the appended claims. For example, in order to conveniently and clearly present a description of the preferred embodiment, the TTK installation utility, the installation script, the translation script, and the translation routines are all indicated as resident on the server. However, it is recognized that other approaches to the indicated partitioning of these functions, or their distribution to more than one processor, represents an insubstantial deviation from the embodiment described above. Therefore, the claims below are intended to embrace all modifications, variations and improvements that fall within the true spirit and scope of the disclosure, as well as substantial equivalents thereof. Accordingly, other embodiments, not particularly described herein, are nonetheless not excluded from the scope of the disclosure, which is defined by the claims.

We claim:

1. A method of installing desired-language translations of software in a computer system, the software to be installed, at the time of assembly of the computer system, in response to a customer's order, the method comprising:

creating a system description record (SDR) including an operating system software in a desired language;

installing selected hardware components;

coupling the computer system to a server;

reading, from the record, a first identifier that identifies the operating system software to be installed in the computer system;

based on the first identifier, establishing a first variable that specifies the operating system type and a second variable that specifies the desired-language;

reading, from the record, a second identifier that identifies other software to be installed in the computer system;

parsing the second identifier into a call to a batch file that (i) causes a native-language version of the other software to be installed in the computer system and (ii) calls a translation script which anticipates text files of more than one type;

based on the type of file in which the other software is stored, and based on the operating system software, the translation script selecting a translation routine from a plurality of sets of available translation routines, each set including individual routines for translating a specific type of text file into a given operating system, the number of translation routine sets being equal to the number of text files times the number of operating systems encountered; and each routine set containing a translation routine for each desired-language into which the native-language text is to be translated.

2. The method as defined in claim 1 further comprising: providing the server for storing the native-language version of the software.

3. The method as defined in claim 1 wherein the computer system is coupled to the server during installation of the software.

4. The method as defined in claim 2 wherein the record is accessible to the server.

5. The method as defined in claim 4 further comprising: an installation script stored on the server.

6. The method as defined in claim 5 wherein the translation script is stored on the server and is called by the installation script which, in turn, calls the translation routine.

7. A method of translating text portions of software during installation of the software in a computer system in a manufacturing environment, the method comprising:

creating a system description record (SDR) including a selection of optional hardware components and an operating system software in a desired-language;

coupling the computer system to a server;

reading, from the record, a first identifier that identifies the operating system software to be installed in the computer system;

based on the first identifier, establishing a first variable that specifies the operating system type and a second variable that specifies the desired-language;

reading, from the record, a second identifier that identifies other software to be installed in the computer system;

parsing the second identifier into a call to a batch file that (i) causes a native-language version of the other software to be installed in the computer system and (ii) calls a translation script which anticipates text files of more than one type;

based on the type of file in which the other software is stored, and based on the operating system software, the translation script selecting a translation routine from a plurality of sets of available translation routines, each set including individual routines for translating a specific type of text file into a given operating system, the number of translation routine sets being equal to the number of text files times the number of operating systems encountered; and each routine set containing a translation routine for each desired-language into which the native-language text is to be translated.

8. The method as defined in claim 7 further comprising: providing the server for storing the native-language version of the software.

9. The method as defined in claim 7 wherein the computer system is coupled to the server during installation of the software.

10. The method as defined in claim 8 wherein the record is accessible to the server.

11. The method as defined in claim 10 further comprising: an installation script stored on the server.

12. The method as defined in claim 11 wherein the translation script is stored on the server and is called by the installation script which, in turn, calls the translation routine.

* * * * *